United States Patent Office 3,549,628
Patented Dec. 22, 1970

3,549,628
SIDE CHAIN CLEAVAGE IN DESACETOXY-
CEPHALOSPORIN ESTERS
Robert R. Chauvette, Indianapolis, Ind., assignor to Eli
Lilly and Company, Indianapolis, Ind., a corporation
of Indiana
No Drawing. Filed July 7, 1967, Ser. No. 651,662
Int. Cl. C07d 99/24
U.S. Cl. 260—243                8 Claims

ABSTRACT OF THE DISCLOSURE

Process for preparing 7-aminodesacetoxycephalosporanic acid esters, and sulfonic acid salts of such esters by (a) treating 7-acylamidodesacetoxycephalosporanate esters with substantially equimolar amounts of phosphorus pentachloride and a basic neutralizing agent in anhydrous solutions above room temperature, (b) commingling alcohol, and then (c) commingling water to form the 7-aminodesacetoxycephalosporanate ester, and optionally, separating the 7-aminodesacetoxycephalosporanate ester from the resulting mixture by forming sulfonic acid salts thereof.

BACKGROUND OF THE INVENTION

This invention relates to the field of desacetoxycephalosporin antibiotic substances. More particularly, this invention provides a process for preparing 7 - amino-desacetoxycephalosporanate esters and sulfonic acid salts of such esters which are useful as intermediates in the preparation of new and known 7-acylamidodesacetoxycephalosporin antibiotic substances from inexpensive penicillins as starting materials.

U.S. Pat. No. 3,275,626, issued Sept. 27, 1966 with Robert B. Morin and Billy G. Jackson as inventors, and entitled "Penicillin Conversion Via Sulfoxide," discloses and claims a method for preparing desacetoxycephalosporins by heating a penicillin sulfoxide ester under acid conditions. This Morin/Jackson discovery presented some practical difficulties. In their process, Morin and Jackson employed penicillin sulfoxide esters such as the methyl ester of the penicillin. These ester groups employed in the Morin and Jackson process could not be removed easily to produce desacetoxycephalosporin antibiotics in any commercially significant yields.

On Aug. 23, 1966, Robert R. Chauvette and Edwin H. Flynn filed application Ser. No. 574,311 which described and claimed procedures for forming easily cleaved esters of penicillins and penicillin sulfoxides to protect the carboxyl group during a process for preparing and converting penicillin sulfoxide esters to desacetoxycephalosporin esters.

However, the heat rearrangement of penicillin sulfoxide esters by the Morin/Jackson process, or as extended to the Chauvette/Flynn easily cleaved esters, produced a mixture of products. Robin D. G. Cooper has recently discovered that the thermal rearrangement of easily cleaved esters of penicillin sulfoxides in certain tertiary carboxamides, ureas, and sulfonamides directs the rearrangement more specifically toward the desired corresponding desacetoxycephalosporin esters.

However, even with these improvements the 7-acylamidodesacetoxycephalosporanate esters obtained from the more readily available penicillin sulfoxide esters by this abovedescribed process generally are not superior antibiotics. Persons skilled in the antibiotic art are still seeking a method of producing better cephalosporin antibiotics from inexpensive materials.

Further, the 7 - acylamidodesacetoxycephalosporins, used herein as starting materials, are not effectively cleaved by the procedure used to cleave cephalosporin C to 7-aminocephalosporanic acid, described in Netherlands patent application 6,401,421, published Aug. 19, 1964. Therefore, there is a need in the cephalosporin antibiotic production art for an effective new process for cleaving 7-acylamidodesacetoxycephalosporin esters, so that more effective desacetoxycephalosporin antibiotics can be synthesized at reasonable cost.

It is an object of this invention to provide a process or method for economically cleaving or removing 7-acyl groups from 7-acylamidodesacetoxycephalosporins.

It is a further object of this invention to provide an economical process for preparing certain 7-aminodesacetoxycephalosporanate ester intermediates from presently available, economically prepared penicillins.

It is a specific object of this invention to provide 7-aminodesacetoxycephalosporanic acid in easily cleavable ester forms, which esters are useful as intermediates for preparing active antibiotic substances by (a) acylation of the 7-amino group thereof with acyl groups which are known to provide the resulting product with clinically significant antibiotic activity and (b) removal of the ester blocking group by known methods.

Other objects, aspects, and advantages of this invention will become apparent from reading the description which follows.

SUMMARY

Briefly, this invention provides a process or method for cleaving an acyl moiety from 7-acylamidodesacetoxycephalosporin antibiotic substances.

The process of this invention is practiced by (a) reacting a 7-acylamidodesacetoxycephalosporanate ester with a phosphorus halide such as phosphorus pentachloride ($PCl_5$) or phosphorus oxychloride ($POCl_3$) or an equivalent halogen source, at an elevated temperature of from about 40° C. to about 80° C. in the presence of about an equivalent of a basic neutralizing agent for each 1 to 1.5 moles of phosphorus halide used in substantially anhydrous solution to form the imino-halide of the 7-acylamidodesacetoxycephalosporanate, (b) commingling or mixing an alcohol with the imino-halide from step (a) to form an imino-ester hydrohalide of the 7-acylamidodesacetoxycephalosporanate ester, (c) commingling or mixing water with the imino-ester hydrochloride from step (b) to cleave the imino-ester hydrochloride and thus to form the 7-aminodesacetoxycephalosporanate ester. The 7-aminodesacetoxycephalosporanate ester product is readily separated from the reaction mixture containing the ester by-product (which is extractable at acid pH) either by extraction from water at near neutral pH with an organic solvent or by adding a sulfonic acid to a solution of this product to precipitate the corresponding sulfonate salt of the 7-aminodesacetoxycephalosporanate ester product.

This invention is quite significant to the antibiotic art in that it contributes to a commercially feasible route to valued desacetoxycephalosporin antibiotics which are not economically obtainable from cephalosporin C. By this invention the Morin-Jackson penicillin sulfoxide ester rearrangement process, as improved by the Chauvette-Flynn and Robin D. G. Cooper contributions, is no longer limited to the production of a desacetoxycephalosporin corresponding to the penicillin-starting material. The 7-aminodesacetoxycephalosporanate esters, produced by the chemical cleavage method of this invention, are key intermediates in the preparation of a number of desirable desacetoxycephalosporin antibiotic substances. For example, on acylation of an ester form of 7-aminodesacetoxycephaloporanic acid such as the 2,2,2-trichloroethyl, the tertiary-butyl, p-methoxybenzyl, p-methoxyphenyl, benzyloxymethyl, or benzhydryl esters, with a protected, activated form of D-α-phenylglycine, there is produced a protected form of a 7-(D-α-phenylglycylamido) desacetoxycephalosporanate ester which can be treated by known methods to remove the ester group and the protecting group so as to produce free 7-(D-α-phenylglycylamido)desacetoxycephalosporanic acid. This acid in zwitterion or pharmaceutically acceptable salt forms thereof is a useful antibiotic in combatting infections caused by gram-positive and gram-negative microorganisms, including penicillin G-resistant *Staphylococcus aureus*.

The 7 - acylamidodesacetoxycephalosporanate esters which are used as starting materials in the process of this invention may be described, conveniently, by the structural formula:

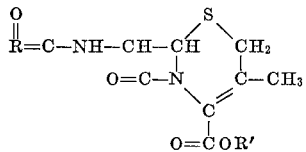

where R is the residue of the acyl group, for example, one derived from the penicillin used, and R' is the residue of the ester group. These starting materials can be prepared by the thermal rearrangement of the corresponding penicillin sulfoxide esters as described in the Morin-Jackson patent above, or as improved by the Chauvette-Flynn and Robin D. G. Cooper contributions. Numerous penicillins derived by fermentation methods known in the prior art (e.g. those penicillins disclosed in Behrens et al., U.S. Patents 2,479,295 to 2,479,297 which issued Aug. 16, 1949; 2,562,407 to 2,562,411 which issued July 31, 1951; and 2,623,876 which issued Dec. 30, 1952), can be converted to sulfoxides, esterified, and rearranged to 7-acylamidodesacetoxycephalosporanate esters for use as starting materials in this invention.

For practical considerations, the preferred starting materials are those 7-acylamidodesacetoxycephalosporanate esters which have been obtained by the heat rearrangement of the corresponding penicillin sulfoxide esters, wherein R, in the above structural formula is phenyl, benzyl, phenoxymethyl, phenylmercaptomethyl, such phenyl, benzyl, phenoxymethyl, and phenylmercaptomethyl substituted with chlorine, methyl, methoxy, or nitro groups, as well as heptyl, and thiophene-2-methyl. Penicillins with these representative R groups are the more economically prepared or more readily obtainable by fermentation methods. Examples of such penicillins and the 7-acylamidodesacetoxycephalosporanate esters which are obtained therefrom after sulfoxide formation, ester formation and heat rearrangement by the above-referenced methods include:

Benzyl penicillin to form 7-(phenylacetamido)desacetoxycephalosporanate ester;

Phenoxymethyl penicillin to form 7-(phenoxyacetamido)desacetoxycephalosporanate ester;

Phenylmercaptomethyl penicillin to form the 7-(phenylmercaptoacetamido)disacetoxycephalosporanate ester;

Heptyl penicillin to form the 7-(octanoamido)desacetoxycephalosporanate ester, and Thiophene-2-methyl penicillin to form 7-(thiophene-2-acetamido)desacetoxycephalosporanate ester;

4.-chlorobenzyl penicillin to form 7-(4'-chlorophenylacetamido)desacetoxycephalosporanate ester;

3,4-dimethoxybenzyl penicillin to form 7-(3',4'-dimethoxyphenylacetamido)desacetoxycephalosporanate ester;

4-methoxyphenoxymethyl penicillin to form 7-(4'-methoxyphenoxyacetamido)desacetoxycephalosporanate ester;

4-methylbenzyl penicillin to form 7-(4'-methylphenylacetamido)desacetoxycephalosporanate ester;

4-nitrophenoxymethyl penicillin to form 7-[2'-(4''-nitrophenoxy)acetamido]desacetoxycephalosporanate ester; and 3,5-dimethylphenylmercaptomethyl penicillin to form 7-[2' - (3'',5'' - dimethylphenylmercapto)acetamido]desacetoxycephalosporanate ester.

The presently preferred ester groups in the above starting materials are those wherein R' in the above formula is one of the following 2,2,2-trichloroethyl, benzyloxymethyl, 4-methoxyphenyl, 4-methoxybenzyl, 3,5-dimethoxybenzyl, benzhydryl, and bis(3,5-dimethoxyphenyl) methyl esters.

The cleavage process can also be applied to 7-acylamidodesacetoxycephalosporanate esters which are obtained from "semisynthetic" penicillins. The "semisynthetic" penicillins are those prepared, for example, by acylating 6-aminopenicillanic acid (6–APA) by known methods. The 6-acylamidopenicillins, or simply penicillins, with sensitive groups protected, if necessary, are then converted to penicillin sulfoxide esters and thermally rearranged by the Morin-Jackson process, or as improved by the Chauvette—Flynn and Robin D. G. Cooper contributions. Examples of such synthetically-obtained penicillins and the 7-acylamidodesacetoxycephalosporanate esters which are obtained therefrom include:

D-α-phenyl-α-aminomethyl penicillin to obtain 7-(D-α-phenylglycylamido)desacetoxycephalosporanate ester;

Butoxymethyl penicillin to obtain 7-(butoxyacetamido) desacetoxycephalosporanate ester; and α-Chlorophenylmethyl penicillin to obtain 7-(α-chlorophenylacetamido)desacetoxycephalosporanate ester.

7-(acylamido)desacetoxycephalosporanate esters for use as starting materials in the process of this invention can also be prepared by acylation and esterification of 7-aminodesacetoxycephalosporanic acid, which has been obtained, e.g., by hydrogenating 7-aminocephalosporanic acid under low pressure in water containing sodium bicarbonate over a palladium on barium sulfate catalyst, as described in J. of Medicinal Chemistry, vol. 7, p. 117, at page 119 (1964). For example, 7-aminodesacetoxycephalosporanic acid can be acylated by treatment with phenylacetylchloride to obtain 7-(phenylacetamido)desacetoxycephalosporanic acid, which can then be esterified by treating it with p-methoxybenzyl alcohol in the presence of dicyclohexyl carbodiimide to obtain p-methoxybenzyl 7-(phenylacetamido)desacetoxycephalosporanate for use in the cleavage process of this invention.

The ester group bonded to the $C_4$-carboxyl group of the 7-acylamidodesacetoxycephalosporanate starting material, and of the resulting 7-aminodesacetoxycephalosporanate product of this invention, described above, can be any ester group which is either easily removable by chemical or enzymatic means or which produces a valuable antibiotic after acylation of the 7-aminodesacetoxycephalosporanate ester. For reasons of convenience and ready availability, the ester group is preferably one which is readily cleaved by known chemical methods, such as by (a) treatment with aqueous acetic acid and zinc dust, (b) treatment with anhydrous trifluoroacetic acid in the cold, (c) mild acid or base hydrolysis, (d) hydrogenolysis, or (e) photolysis.

The process of the invention proceeds through the following series of reactions:

(a) The selected 7-(acylamido)desacetoxycephalosporanate ester, dissolved in an appropriate anhydrous organic solvent to which is added an anhydrous basic neutralizing agent, is commingled or mixed with phosphorus pentachloride or phosphorus oxychloride or an equivalent halogenating agent and heated to an elevated temperature below the decomposition point of the reactants to form an imino-chloride of the 7-(acylamido) desacetoxycephalosporanate. Organic liquid solvents which may be used can be polar or nonpolar but should not be hydroxylated and include benzene, toluene, xylene, hexane, acetone, dioxane, heptane, ethyl acetate, propyl acetate, amyl acetate, ethylene chloride, or mixtures of similar organic liquids. The basic neutralizing agent which is in the solution mixture may be any hydrogen halide absorber which does not interfere with the course of the cleavage reaction of this invention. Preferred neutralizing agents are tertiary amines such as pyridine, N-methylpiperidine, picoline, trialkylamines such as triethylamine, tripropylamine, as well as dibasic tertiary aliphatic amines such as N,N,N',N'-tetramethylethylene diamine, and tertiary aromatic amines such as diphenyl(methyl)amine, and alkali metal bicarbonates such as sodium bicarbonate, potassium bicarbonate, and the like.

The optimum elevated temperature will depend somewhat on the choice of anhydrous solvent medium, the speed of the reaction desired, the concentration of the reactants, and the like. However, for most circumstances heating the mixture to a temperature of from about 40° C. to about 80° C., preferably from about 55° C. to about 65° C. until the reaction is essentially completed, which is usually within about 5 hours is sufficient. Studies indicate that the optimum time is usually from about 0.5 to about 2 hours.

Of the halogenating agents which are used to form the imino-chloride in step (a), phosphorus pentachloride is preferred since it appears to be more efficient, but phosphorus oxychloride or other equivalent halogenating agents can be used. For ease of operation, the phosphorus halide may be added all at once.

The ratio of the phosphorus chloride or equivalent halogenating agent and the basic neutralizing agent with respect to the concentration of the 7-acylamidodesacetoxycephalosporanate ester does not appear to be critical. For example, molar ratios of about 1 equivalent to a little more than 3 equivalents of each of phosphorus pentachloride and pyridine to 1 equivalent of the ester have been used without significant effect on the process. To insure significant yields, however, it is essential to have the quantities of the chlorinating agent at least equivalent to the basic neutralizing agent. A ratio of about 1 molar proportion of phosphorus pentachloride to about 1 molar equivalent of pyridine is preferred for better yields, although ratios of from about 1 to about 1.5 moles of phosphorus halide to 1 equivalent of basic material can be used to obtain the desired product. Large excesses of basic neutralizing agent, e.g., pyridine, relative to the amount of phosphorus pentachloride render the reaction mixture neutral or basic, and are detrimental to the cleavage reaction. Excesses of the 7-acylamidodesacetoxyphalosporanate ester starting material relative to the amount of phosphorus halide and basic material can be used but such practice is wasteful in that some of the more expensive esters may not be cleaved as desired.

(b) The inert organic solvent in the resulting mixture from the chlorination step, described above, may be replaced by an excess of an alcohol or may be diluted with an excess of an alcohol to form an imino-ester hydrochloride from the 7-acylamido function of the 7-acylamidodesacetoxycephalosporanate ester and to destroy any excess phosphorus chloride or equivalent chlorinating agent. It is not necessary to remove the inert organic liquid solvent before addition of alcohol. However, better yields of the desired 7-aminodesacetoxycephalosporanate ester have been obtained when most of the organic solvent, e.g., benzene, toluene, or the like, has been removed by evaporation or distillation under vacuum before addition of the alcohol. Any alcohol can be used which will form an imino-ester hydrochloride of the 7-acylamidodesacetoxycephalosporanate ester and which alcohol is easily removed by evaporation or distillation under vacuum, at temperatures below about 100° C., preferably below about 50° C. or which can be easily replaced in the hydrolysis step (c).

The simple alkanols having from 1 to about 6 carbon atoms, such as methanol, ethanol, n-propanol, isopropanol, isobutanol, tert-butanol, amyl alcohols, hexanol and mixtures thereof as well as benzyl alcohol, cyclohexanol, cyclopentanol, and the like, are most appropriate. Methanol, ethanol, and isopropanol are preferred for reasons of cost and ease of separation.

(c) The alcohol of the reaction mixture obtained as described above in step (b) is for the most part removed, preferably by evaporation in vacuo, and the residue is treated with water at the existing pH, which is generally below about 2 to effect cleavage of the imino-ester hydrohalide to the 7-aminodesacetoxycephalosporanate ester product and an ester by-product of the 7-acyl group and the alcohol. An excess of water to insure complete cleavage is desirable.

The 7-aminodesacetoxycephalosporanate esters, thus obtained, may be separated from the reaction mixture by a variety of methods involving, e.g., solvent extraction at near neutral pH, evaporation, and crystallization from various solvents. However, it is preferred to separate the 7-aminodesacetoxycephalosporanate ester from the solvent extraction solution by adding a sulfonic acid to form a sulfonate salt of the 7-aminodesacetoxycephalosporanate ester which selectively precipitates in crystalline form. Preferred sulfonic acids for use in this manner are the aromatic hydrocarbon sulfonic acids having from 6 to about 12 carbon atoms in the aromatic hydrocarbon moiety, as well as such aromatic hydrocarbon sulfonic acids substituted with noninterfering substituents such as alkyl (1 to 12 carbon atoms), amino, nitro, azo, bromo, chloro, hydroxy, and the like. The aromatic hydrocarbon sulfonic acids and the like are preferred because they form insoluble salts with the 7-aminodesacetoxycephalosporanate esters, which salts readily precipitate from solutions of the crude 7-aminodesacetoxycephalosporanate ester reaction mixtures, and by this method can be readily separated therefrom by filtration. Examples of aromatic sulfonic acids useful for this purpose include, e.g., benzenesulfonic acid, toluenesulfonic acids, biphenylylsulfonic acid, xylenesulfonic acids, p-hydroxyazobenzene - p - sulfonic acid, azobenzene - p - sulfonic acid, 5-nitro - naphthalene-1-sulfonic acid, naphthalene - 2 - sulfonic acid, 2-bromotoluene-5-sulfonic acid, butylbenzenesulfonic acid, nonylbenzenesulfonic acid, dodecylbenzenesulfonic acids, and aminoaryldisulfonic acids such as 2-amino - 1,4 - benzenedisulfonic acid, 7-amino - 1,3 - naphthalenedisulfonic acid, 6 - amino-1,3-naphthalenedisulfonic acid, 8 - amino-1,5-naphthalenedisulfonic acid, and the like. Salts of such sulfonic acids such as the ammonium, substituted ammonium, alkali metal, and alkaline earth metal salts may also be used.

Other hydrocarbon sulfonic acids which may be used to form salts with the 7-aminodesacetoxycephalosporanate esters of this invention include the alkanesulfonic acids such as methanesulfonic acid, ethanesulfonic acid, and the like, but these salts do not precipitate from solution as easily as do the heavier aromatic hydrocarbon sulfonic acid salts.

For acylation, the 7-aminodesacetoxycephalosporanate ester sulfonate salts can be converted to the free 7-aminodescetoxycephalosporanate ester by extraction from an ether-aqueous mixture of the sulfonate salt adjusted to near neutral pH.

The 7-aminodesacetoxycephalosporanate esters of this invention are useful for preparing 7-acylamidodesacetoxycephalosporanic acids by (a) acylation of the 7-amino group, and (b) de-esterification of the resulting 7-acylamidodesacetoxycephalosporanate ester. A specific example follows:

When 2,2,2-trichloroethyl 7 - aminodesacetoxycephalosporanate in cold (0° C.–5° C.) dimethylformamide is treated with N-(2,2,2 - trichloroethyloxycarbonyl)-D-α-phenylglycyl chloride, there is formed 2,2,2 - trichloroethyl 7-[N-(2,2,2 - trichloroethyloxycarbonyl) - D - α-phenylglycylamido]desacetoxycephalosporanate in good yield. This product, upon treatment with zinc dust in aqueous formic acid, cleaves to 7-(D - α - phenylglycylamido)desacetoxycephalosporanic acid zwitterion, also known generically as cephalexin, a highly effective antibiotic. Similarly, the benzhydryl (diphenylmethyl) ester of 7-aminodesacetoxycephalosporanate may be (a) liberated from its p-toluenesulfonate salt, as described above, (b) acylated with thiophene-2-acetyl chloride under known acylating conditions to form the benzhydryl 7 - (thiophene - 2 - acetamido)desacetoxycephalosporanate ester, and (c) de-esterified by hydrogenolysis to obtain 7-(thiophene - 2 - acetamido)desacetoxycephalosporanic acid, which is useful as an antibiotic against penicillin-resistant strains of *Staphylococcus aureus*.

The following sets of chemical equations illustrate the relationship of the process and new esters of this invention (II) to the penicillin sulfoxide ester heat rearrangement process of Morin and Jackson (I), and further illustrate the use of esters of this invention as intermediates in obtaining descetoxycephalosporin antibiotics (III).

(I) This first set of equations illustrates by chemical structures how starting materials used in the process of this invention can be prepared.

(a)
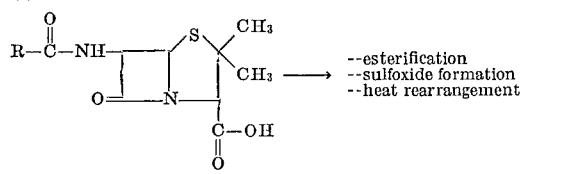

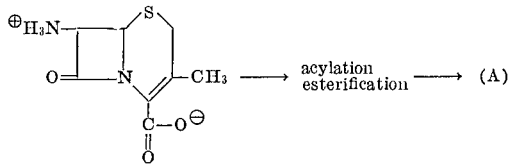

or (b)

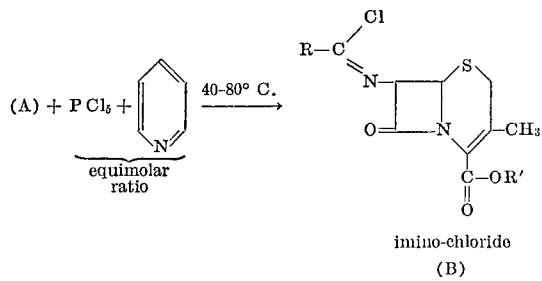

where R is the residue of the penicillin or desacetoxycephalosporin acyl group, and R' is the residue of the ester group.

II) This second set of equations illustrates the steps of the process of this invention, and the generic structure of the new products of this invention.

(a)

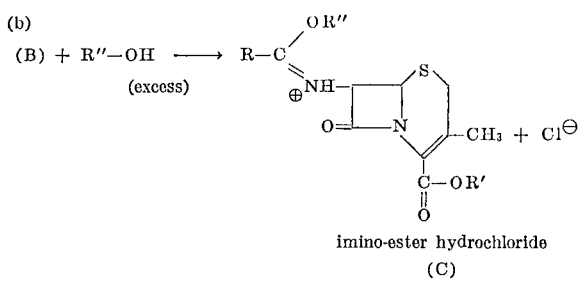

(b)

(B) + R''—OH ⟶ (excess)

imino-ester hydrochloride
(C)

(c)
(C) + H$_2$O $\xrightarrow{\text{pH 1.5-2}}$ $\xrightarrow{\text{pH 6.5}}$

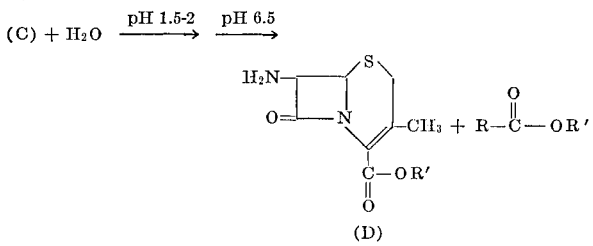

(d) (Optional)

D$_1$=p-toluenesulfonate salt

D$_2$=naphthalene-2-sulfonate salt (III) This third set of chemical structures indicates an example of a use of the ester products of this invention to prepare an effective antibiotic. The specific product example used to illustrate this invention is 2,2,2-trichloroethyl 7 - aminodesacetoxycephalosporanate, where R' is —CH$_2$CCl$_3$, which leads to 7-(D-α-phenylglycylamido)desacetoxycephalosporanic acid in zwitterion form (cephalexin).

(a)
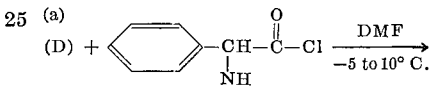

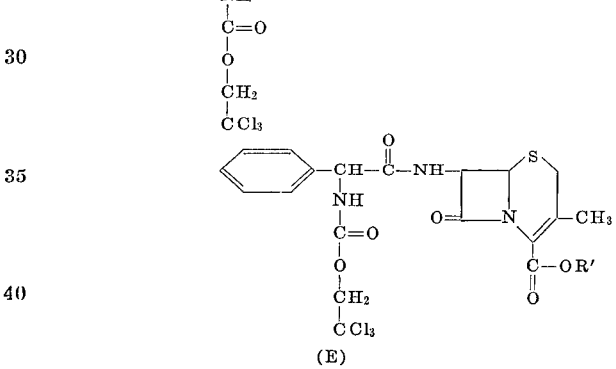

(b)
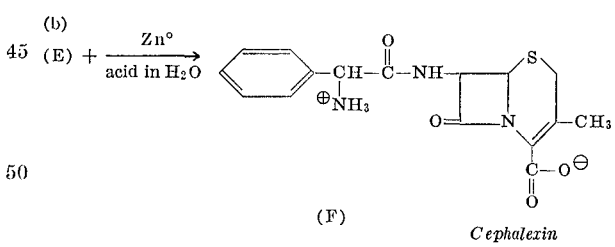

or, alternatively, (a)
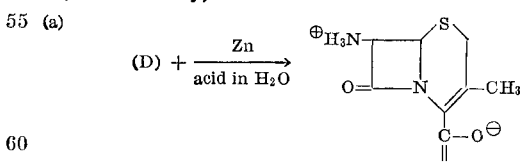

(b)
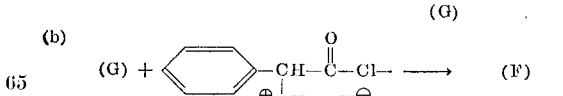

Examples of other 7-acylamidodesacetoxycephalosporin antibiotics which can be prepared by known acylation and de-esterification methods from the 7 - aminodesacetoxycephalosporanate ester products of this invention include:

7-(dl-α-amino-2-thienylacetamido)desacetoxycephalosporanic acid 7-(dl-α-amino-2-thienylacetamido)desacetoxycephalosporanic acid trifluoroacetate 7-(D-α-amino-m-chlorophenylacetamido(desaacetoxy-cephalosporanic acid
7-(dl-α-amino-p-chlorophenyllacetamido)desacetoxy-cephalosporanic acid
7-(dl-α-amino-p-chlorophenylacetamido)desacetoxy-cephalosporanic acid trifluoroacetate
7-(dl-α-amino-m-bromophenylacetamido)-3-methyl-$\Delta^3$-cephem-4-carboxylic acid
7-(dl-α-amino-m-bromophenylacetamido)-3-methyl-$\Delta^3$-cephem-4-carboxylic acid trifluoroacetate
7-(dl-α-amino-m-fluorophenylacetamido)-3-methyl-$\Delta^3$-cephem-4-carboxylic acid
7-(dl-α-amino-m-methoxyphenylacetamido)-3-methyl-$\Delta^3$-cephem-4-carboxylic acid
7-(dl-α-amino-m-methoxyphenylacetamido)-3-methyl-$\Delta^3$-cephem-4-carboxylic acid triffuoroacetate
7-(D-α-amino-m-hydroxyphenylacetamido)-3-methyl-$\Delta^3$-cephem-4-carboxylic acid
7-(p-chlorophenoxyacetamido)-3-methyl-$\Delta^3$-cephem-4-carboxylic acid potassium salt
7-(α-thienylmercaptoacetamido)-3-methyl-$\Delta^3$-cephem-4-carboxylic acid potassium salt
7-(m-nitrophenoxyacetamido)-3-methyl-$\Delta^3$-cephem-4-carboxylic acid potassium salt
7-phenylmercaptoacetamido-3-methyl-$\Delta^3$-cephem-4-carboxylic acid potassium salt
7-(n-butylmercaptoacetamido)-3-methyl-$\Delta^3$-cephem-4-carboxylic acid potassium salt
7-(m-chlorophenylmercaptoacetamido)-3-methyl-$\Delta^3$-cephem-4-carboxylic acid potassium salt
7-(o-trifluoromethylphenylmercaptoacetamido)-3-methyl-$\Delta^3$-cephem-4-carboxylic acid potassium salt These compounds are found to be effective as antibiotics against penicillin-resistant strains of *Staphylococcus aureus*.

The invention is further illustrated by the following detailed examples.

Example 1

A 7.8-millimole portion of 2,2,2-trichloroethyl 7-phenoxyacetamidodesacetoxycephalosporanate, obtained by the heat rearrangement of the 2,2,2-trichloroethyl penicillin V sulfoxide ester by the Morin-Jackson method, as improved by the Chauvette-Flynn and Robin D. G. Cooper contributions, was dissolved in 210 ml. of calcium hydride-dried benzene containing 2,2 g. (28 millimoles) of dry pyridine. The resulting solution was warmed to 60 to 70° C. and then, while stirring, 5.9 g. (28 millimoles) of phosphorus pentachloride were added. The resulting reaction mixture was stirred and heated at 60 to 70° C. under a nitrogen atmosphere for 2 hours to insure complete reaction. The mixture was then cooled in ice and treated with 420 ml. of cold methanol. The reaction solution was stored at room temperature overnight. The solvents were removed by evaporation in vacuo using a water bath below 50° C. The residue was taken up in a 1:1 by volume water: tetrahydrofuran mixture and allowed to stand at room temperature for two hours. The tetrahydrofuran was evaporated. The aqueous residue with its oily precipitate was slurried with ethyl acetate. This mixture was then adjusted to pH 6.5 with 1 N sodium hydroxide. The ethyl acetate layer was separated, washed with water, dried over magnesium sulfate, and then concentrated to about 300 ml. volume under vacuum. Then 2.65 g. (14 millimoles) of p-toluenesulfonic acid were added to the concentrated solution. Immediately, the crystalline sale, 2,2,2-trichloroethyl 7-aminodesacetoxycephalosporanate p-toluenesulfonate, began to precipitate. The crude salt was filtered off, washed with cold ethyl acetate, and weighed (2.1 g., 51 percent yield). A 1.2 g.-portion of the crude salt was dissolved in 75 ml. of hot ethanol, filtered, diluted with 75 ml. of ethyl ether, and allowed to crystallize slowly at room temperature. This afforded an analytical sample which had a melting point of 193 to 194° C. (dec.).

*Analysis.*—Calcd. for $C_{17}H_{19}Cl_3N_2O_6S_2$ (percent): C, 39.42; H, 3.69; N, 5.41. Found (percent): C, 39.50; H, 3.84; N, 5.23. Infrared, ultraviolet, and nuclear magnetic resonance data were consistent with the named product.

Example 2

A 500-mg. portion of the 2,2,2-trichloroethyl 7-aminodesacetoxycephalosporanate p-toluenesulfonate salt from Example 1 was taken up in a water-ethyl ether mixture and the resulting mixture was adjusted to pH 7 with 1 N sodium hydroxide. The ether layer, containing the product, was separated from the aqueous phase, washed with water, dried over magnesium sulfate, and evaporated to dryness in vacuo. The residue was taken up in cyclohexene, crystallized therefrom, and then recrystallized from a cyclohexene-petroleum ether (B.P. 30 to 60° C.) mixture. The 2,2,2-trichloroethyl 7 - aminodesacetoxycephalosporanate crystalline product, thus obtained, had a melting point of 82 to 84° C.

*Analysis.*—Calcd. for $C_{10}H_{11}Cl_3N_2O_3S \cdot C_6H_{10} \cdot H_2O$ (percent): C, 43.10; H, 5.19; N, 6.28. Found (percent): C, 43.50; H, 5.15; N, 6.35.

Example 3

In 30 ml. of dry benzene containing 237 mg. (3.0 millimoles) of pyridine there were dissolved 970 mg. (2.0 millimole) of 2,2,2 - trichloroethyl 7-phenoxyacetamidocephalosporanate (obtained by acylation and esterification of 7 - aminodesacetoxycephalosporanic acid). The flask containing the resulting solution was placed in a water bath at 60° C. While stirring the solution, 630 mg. 3.0 millimoles) of phosphorus pentachloride were added and the mixture was stirred at this temperature under a nitrogen atmosphere for 2 hours. The mixture was cooled to room temperature, treated with 60 ml. of cold anhydrous ethanol, and stored at room temperature overnight. The solvents were then evaporated in vacuo. The residual oil was dissolved in 50 ml. of tetrahydrofuran and 50 ml. of water and stored at room temperature for four hours. The tetrahydrofuran was removed in vacuo. The resulting aqueous phase was diluted further with water and extracted with toluene. The toluene was selective in removing starting material and leaving the 7-aminodesacetoxycephalosporanate ester hydrochloride in water. This resulting aqueous phase was then slurried with ethyl acetate for a pH adjustment to 6.5 with 1 N sodium hydroxide. The ethyl acetate phase, containing the 7-aminodesacetoxycephalosporanate ester, was separated, washed with water, dried over magnesium sulfate, and then evaporated in vacuo to leave as residue 650 mg. of crystalline 2,2,2-trichloroethyl 7-aminodesacetoxycephalosporanate.

Example 4

A 970 mg. (2.0 millimole) portion of 2,2,2-trichloroethyl 7 - phenoxyacetamidodesacetoxycephalosporanate (obtained by acylation and esterification of 7-aminodesacetoxycephalosporanic acid) was dissolved in 30 ml. of dry benzene containing 174 mg. (2.2 millimoles) of dry pyridine. The solution container was placed in a water bath at 65° C. While stirring, 458 mg. (2.2 millimoles) of phosphorus pentachloride were added and the mixture stirred at 65° C. under nitrogen for 2 hours. The resulting reaction mixture was cooled, treated with 60 ml. of cold anhydrous ethanol, and stored at 5° C. overnight. The solvents were then evaporated in vacuo. The residual oil was triturated with cold water, extracted with ethyl acetate, dried over magnesium sulfate, and evaporated to remove ethyl acetate. Thin-layer chromatographic examination of the crude residue showed that it contained some of the desired product. The aqueous phase used in the trituration was slurried with ethyl acetate and then adjusted (from pH about 2) to pH 6.5 with 1 N NaOH. The ethyl acetate was separated, dried over magnesium sulfate, and concentrated to near dryness in vacuo. On cooling, the 2,2,2 - trichloroethyl 7 - aminodesacetoxycephalosporanate crystallized. Yield, 220 mg.

In an NMR spectrum of the product in deuterated chloroform (CDCl$_3$) the area beneath the curve between 8.1 and 4.9τ integrated and analyzed for 11 protons. The 7-amino protons were represented by a broad signal at 8.02τ, the C–3 methyl protons were a signal at 7.80τ, the methylene adjacent to the sulfur was a quartet centered at 6.54τ, and the β-lactam protons and the methylene protons of the trichloroethyl ester made a complex pattern in the region of 5.3 and 4.9τ.

Treatment of a sample of the 2,2,2-trichloroethyl 7-aminodesacetoxycephalosporanate ester with β-naphthalenesulfonic acid in ethyl acetate gave the crystalline 2,2,2-trichloroethyl 7 - aminodesacetoxycephalosporanate β - naphthalenesulfonate salt, which salt was recrystallizable from ethanol-ethyl ether to give a crystalline salt, M.P. 192 to 193° C. (Dec.).

Analysis.—Calcd. for $C_{20}H_{19}Cl_3N_2O_6S_2$ (percent): C, 43.36; H, 3.45; N, 5.05. Found (percent): C, 43.56; H, 3.65; N, 4.92.

Example 5

In 60 ml. of dry benzene containing 270 mg. (3.4 millimoles) of dry pyridine there were dissolved 1.1 g. (2.3 millimoles) of 2,2,2-trichloroethyl 7-(phenoxyacetamido)desacetoxycephalosporanate. The solution container was placed on a water bath and the solution was warmed to 60 to 70° C. While stirring the mixture, 521 mg. (3.4 millimoles) of phosphorus oxychloride were added and then the resulting solution was maintained at this temperature, with stirring, under a nitrogen atmosphere for 2 hours to insure complete reaction. The mixture was cooled to room temperature and then 120 ml. of methanol were added. The mixture was stored at room temperature overnight. The solvents were evaporated and the residue was taken up in a mixture of water and tetrahydrofuran for hydrolysis at room temperature for 15 minutes. The tetrahydrofuran was evaporated, and the aqueous phase together with the resulting precipitated oil was slurried with ethyl acetate. The pH of the mixture was adjusted to pH 6.5. The ethyl acetate portion was washed with water, dried over magnesium sulfate, and then concentrated to about 75 ml. The resulting concentrate was treated with 436 mg. (3.4 millimoles) of p-toluenesulfonic acid. There were obtained 180 mg. (15 percent yield) of 2,2,2-trichloroethyl 7-aminodesacetoxycephalosporanate p-toluenesulfonate salt.

Example 6

Into 120 ml. of dry benzene containing 540 mg. (6.8 millimoles) of dry pyridine there were added 2.2 g. (4.6 millimoles) of 2,2,2-trichloroethyl 7-(phenoxyacetamido) desacetoxycephalosporanate. The resulting solution was placed in a water bath at 65° C. While stirring, 1.4 g. (6.8 millimoles) of phosphorus pentachloride were added and the mixture was maintained at this temperature under nitrogen for 2 hours.

The benzene was then removed in vacuo to leave a black solid residue. The residue was taken up in 240 ml. of cold methanol and stored at room temperature overnight. The methanol was removed in vacuo and the residue was redissolved in water-tetrahydrofuran for hydrolysis at room temperature for 15 minutes. The organic solvent was removed in vacuo. The aqueous phase with the resulting precipitated oil was slurried with ethyl acetate, and the pH was adjusted to 6.5. The ethyl acetate portion was separated from the aqueous phase, washed with water, dried over magnesium sulfate, and concentrated to 150 ml. volume. The concentrate was treated with 875 mg. (6.8 millimoles) of p-toluenesulfonic acid. There was obtained as a crystalline precipitate, 1.9 g. (80 percent yield) of 2,2,2-trichloroethyl 7-aminodesacetoxycephalosporanate p-toluenesulfonate.

Example 7

An 800-mg. (1.7 millimole) portion of 2,2,2-trichloroethyl 7 - (phenylacetamido)desacetoxycephalosporanate was suspended in 50 ml. of dry benzene containing 206 mg. 2.6 millimoles) of dry pyridine. The mixture was warmed in a water bath to 65° C. Then 540 mg. (2.6 millimoles) of phosphorus pentachloride were added and the mixture was stirred for 2 hours at this temperature. The resulting reaction mixture was cooled to room temperature and then mixed with 100 ml. of cold methanol. The resulting solution was stored at room temperature overnight. The next day the solvents were removed in vacuo and the residue was taken up in a water-tetrahydrofuran mixture and allowed to stand for 20 minutes. The tetrahydrofuran was evaporated off and the aqueous residue was adjusted to pH 6.5 in the presence of ethyl acetate. The ethyl acetate phase was separated, washed with water, dried over magnesium sulfate, and concentrated under vacuum to about 50 ml. Then 325 mg. (1.7 millimoles) of p-toluenesulfonic acid in about 15 ml. of ethyl acetate were added to the concentrate. The product, 2,2,2-trichloroethyl 7-aminodesacetoxycephalosporanate p-toluenesulfonate precipitated as a crystalline solid. This salt was filtered off and washed with anhydrous ethyl ether. Yield, 660 mg. (75 percent).

Example 8

In 50 ml. of a solution of 90 percent acetic acid in water, 4 millimoles of 2,2,2-trichloroethyl 7-aminodesacetoxycephalosporanate were dissolved and stirred in the cold for 2 hours with 2 g. (31 millimoles) of zinc dust. The acetic acid was removed in vacuo. The residue was taken up in a mixture of 50 ml. of water and 100 ml. of ethyl acetate, cooled in an ice-water bath, and acidified to pH 0.5 with concentrated hydrochloric acid. The unreacted zinc and other insolubles were removed by filtration. The ethyl acetate layer was separated and discarded. The aqueous layer was adjusted to the isoelectric point of 7-aminodesacetoxycephalosporanic acid (about pH 3.6). Immediately, the 7-aminodesacetoxycephalosporanic acid zwitterion precipitated in the form of white crystals. The yield was 690 mg. (80 percent). This product was shown by UV, ET (electrometric titration), and NMR analyses to correspond with 7-aminodesacetoxycephalosporanic acid obtained by catalytic hydrogenolysis of 7-aminocephalosporanic acid (7–ACA) as described in the Journal of Medicinal Chemistry, vol. 7, p. 117 (1964).

Example 9

The benzyloxymethyl 7-aminodesacetoxycephalosporanate ester is prepared by following the cleavage procedure of Example 1, by substituting the benzyloxymethyl 7-phenoxyacetamidodesacetoxycephalosporanate for the corresponding 2,2,2-trichloroethyl ester of that example. The benzyloxymethyl 7 - aminodesacetoxycephalosporanate product is readily separated from the reaction mixture by adding biphenylyl sulfonic acid thereto to form the benzyloxymethyl 7-aminodesacetoxycephalosporanate biphenylylsulfonate salt, which precipitates from the liquid mixture.

Example 10

In a solution of dry benzene containing 28 millimoles of dry pyridine there are dissolved 7.8 millimoles of p-methoxybenzyl 7-(thiophene - 2 - acetamido)desacetoxycephalosporanate. The resulting solution is warmed to 50 to 60° C., and then while stirring 28 millimoles of phosphorous pentachloride are added at one time. The mixture is stirred at this temperature under a nitrogen atmosphere for about 1 hour. The resulting mixture is then cooled to 0 to 5° C. and treated with an excess of ethanol. This ethanol-treated mixture is stored for several hours at room temperature. After removing most of the benzene and ethanol solvents by evaporation below 50° C. under reduced pressure, the residue (having a pH of about 1.8) is taken up in a 1:1 by volume mixture of water and tetrahydrofuran. After 2 hours, the tetrahydrofuran is removed and the aqueous residue is slurried with ethyl acetate and adjusted to pH 6.5 with 1 N aqueous sodium hydroxide. The ethyl acetate layer containing the crude p - methoxybenzyl 7 - aminodesacetoxycephalosporanate ester product is treated with about 8 millimoles of azobenzene-p-sulfonic acid to precipitate the p-methoxybenzyl 7-aminodesacetoxycephalosporanate azobenzene - p - sulfonate salt, which is separated from the reaction mixture by filtration. The separated salt can be stored in the salt form or taken up in ethyl ether-water mixture and adjusted to near pH 7 to separate the pure p-methoxybenzyl 7-aminodesacetoxycephalosporanate product from the ethyl acetate layer.

This ester product can be used as an intermediate, e.g., to prepare cephalexin by acylating the amino-ester with N-(tert-butyloxycarbonyl)-D-α-phenylglycine in a mixed anhydride reaction and treating the resulting product with cold anhydrous trifluoroacetic acid for 5 minutes to obtain 7 - (D - α-phenylglycylamido)desacetoxycephalosporanic acid (cephalexin). This antibiotic can be administered topically, parenterally, or orally in doses of from 100 mg. to about 500 mg. from 1 to about 4 times per day, depending upon the infectious condition being treated.

As used in this specification, an "equivalent" of a basic neutralizing agent is the weight in grams which in its reaction corresponds to a gram atom of hydrogen or of hydroxyl or half a gram atom of oxygen or a gram atom of a univalent ion. Thus, for example, for each equivalent of pyridine (79.10 g.) or N,N'-tetramethylethylenediamine $$\left(\frac{116\ g}{2} = 58\ g.\right)$$

which reacts, there can be used from about 1 to about 1.5 moles of phosphorous pentachloride (208 to about 312 g.) per mole of ester.

Example 11 p - Methoxybenzyl 7-phenoxyacetamidodesacetoxycephalosporanate (crude, from the thermal rearrangement of p-methoxybenzyl ester of penicillin V sulfoxide), 984 mg. (2.1 mm.) was dissolved in 30 ml. of dry benzene containing dry pyridine, 245 mg. (3.1 mm.), and was heated in a water bath at 50° C. Phosphorous pentachloride, 645 mg. (3.1 mm.) was added and the mixture was stirred at this temperature and under nitrogen for one hour. The benzene was removed in vacuo and replaced with 60 ml. of cold methanol. The resulting solution was stored at room temperature and under nitrogen overnight. The alcohol was evaporated in vacuo and the residue redissolved in 100 ml. of tetrahydrofuran and 50 ml. of water. After 30 minutes at room temperature the tetrahydrofuran was evaporated in vacuo. The aqueous residue was slurried with ethyl acetate and adjusted to pH 6.5. The ethyl acetate extract containing the p-methoxybenzyl 7 - aminodesacetoxycephalosporanate was separated, washed with water, dried (MgSO₄) and theated with p-toluene sulfonic acid, 400 mg. (2.1 mm.). The p-toluenesulfonate salt of the 7-aminodesacetoxycephalosporanate ester crystallized in 47 percent yield. This was recrystallized from ethanol-ethyl ether, M.P. 162° C. to 165° C.

*Analysis.*—Calcd. for C₂₃H₂₆N₂O₇S₂ (percent): C, 54.52; H, 5.17; N, 5.53. Found (percent): C, 54.30; H, 5.25; N, 5.67.

I claim:
1. A process which comprises
  (a) reacting a phosphorus halide selected from the group consisting of phosphorus pentachloride and phosphorus oxychloride with an ester of a 7-acylamidodesacetoxycephalosporanic acid of the formula

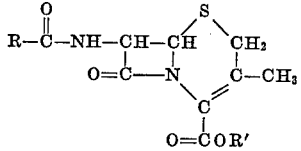

where R is the residue of the acyl group derived from the penicillin used, and R' is the residue of the ester group, resulting from the thermal rearrangement of the corresponding penicillin sulfoxide ester in a nonhydroxylated anhydrous organic liquid solvent at a temperature of from about 40° C. to about 80° C. in the presence of about 1 equivalent of basic neutralizing agent for from 1 to about 1.5 moles of phosphorus halide to form an amino-halide of the 7-acylamidodesacetoxycephalosporanate,
  (b) commingling or mixing an alcohol with the iminohalide from step (a) to form an imino-ester hydrochloride of the 7-acylamidodesacetoxycephalosporanate,
  (c) commingling water with the imino-ester hydrochloride to form a 7-aminodesacetoxycephalosporanic acid ester.
2. A process as defined in claim 1 which further includes the step of adding an aromatic hydrocarbon sulfonic acid having from 6 to about 12 carbon atoms in the aromatic hydrocarbon moiety to the 7-aminodesacetoxycephalosporanate ester product to form an aromatic hydrocarbon sulfonate salt thereof.
3. A process which comprises
  (a) reacting phosphorus pentachloride with an ester of a 7-acylamidodesacetoxycephalosporanic acid of the formula

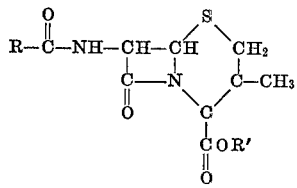

wherein R is selected from the group consisting of phenyl, benzyl, phenoxymethyl, phenylmercaptomethyl, such phenyl, benzyl, phenoxymethyl, and phenylmercaptomethyl substituted with chlorine, methoxy, methyl, or nitro, and heptyl, and thiophene-2-methyl; and R' is selected from the group consisting of 2,2,2-trichloroethyl, benzyloxymethyl, 4-methoxyphenyl, 4-methoxybenzyl, 3,5 - dimethoxybenzyl, benzhydryl, and bis(3,5-dimethoxyphenyl) methyl, in a nonhydroxylated anhydrous organic liquid solvent at a temperature of from about 40° C. to about 80° C. in the presence of about 1 equivalent of a tertiary amine for from 1 to about 1.5 moles of phosphorus pentachloride to form an imino-chloride of the 7-acylamidodesacetoxycephalosporanate;
  (b) commingling or mixing methanol with the iminochloride from step (a) to form an imino-ester hydrochloride of the 7 - acylamidodesacetoxycephalosporanate ester;
  (c) commingling water with the imino-ester hydrochloride of the 7-acylamidodesacetoxycephalosporanate ester so that the pH of the mixture, after water addition is below about 2, to form a 7-aminodesacetoxycephalosporanate ester.
4. A process as defined in claim 3 wherein:
  (a) phosphorus pentachloride is commingled with a solution of 2,2,2 - trichloroethyl 7-(2-phenoxyacetamido)desacetoxycephalosporanate in an anhydrous organic liquid solvent, said solution also containing pyridine in an amount substantially equimolar to the phosphorus pentachloride, to form the iminochloride;
  (b) excess methanol is mixed with the imino-chloride from step (a) to form the imino-ester hydrochloride; and
  (c) water is mixed with the imino-ester hydrochloride from step (b) to form 2,2,2-trichloroethyl 7-aminodesacetoxycephalosporanate.
5. A process as defined in claim 4 wherein the 2,2,2-trichloroethyl 7-aminodesacetoxycephalosporanate is reacted with a sulfonic acid selected from the group consisting of toluenesulfonic acids and naphthalenesulfonic acids to form the respective sulfonate salt of 2,2,2-trichloroethyl 7-aminodesacetoxycephalosporanate.

6. A compound as in claim 8, said compound being a toluenesulfonic acid salt of 2,2,2-trichloroethyl 7-aminodesacetoxycephalosporanate.

7. A compound as in claim 8, said compound being a naphthalenesulfonic acid salt of 2,2,2-trichloroethyl 7-aminodesacetoxycephalosporanate.

8. Toluenesulfonic and naphthalenesulfonic acid salts of esters of the formula

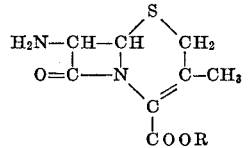

wherein R is selected from the group consisting of 2,2,2-trichloroethyl, benzyloxymethyl, tert-butyl,p-methoxyphenyl, 3,5-dimethoxybenzyl, and p-methoxybenzyl.

References Cited
UNITED STATES PATENTS

| | | | |
|---|---|---|---|
| 3,352,858 | 1/1967 | Crast et al. | 260—243C |
| 3,422,099 | 1/1969 | Crast | 260—243C |
| 3,449,336 | 6/1969 | Woodward | 260—243C |

NICHOLAS S. RIZZO, Primary Examiner

U.S. Cl. X.R.

424—246